United States Patent [19]
Hwang

[11] Patent Number: 5,302,883
[45] Date of Patent: Apr. 12, 1994

[54] AUTOMATED APPARATUS AND METHOD FOR THE REPRODUCTION OF SAME COLOR TEMPERATURE LUMINOUS INTENSITY STANDARD LIGHT SOURCE

[75] Inventor: Kent-Hao Hwang, Chutung, Taiwan

[73] Assignee: Industrial Techology Research Institute, Chutung, Taiwan

[21] Appl. No.: 965,353

[22] Filed: Oct. 23, 1992

[51] Int. Cl.$^5$ ............................................. H05B 37/02
[52] U.S. Cl. .................................. 315/149; 315/291; 324/96; 250/252.1
[58] Field of Search ............... 315/158, 291, 157, 155, 315/307; 307/157; 250/252.1; 324/414, 96; 356/229, 230, 231, 232, 46, 47; 358/139

[56] References Cited
U.S. PATENT DOCUMENTS
3,856,405  12/1974  Lazarus ............................... 250/226

Primary Examiner—Steven Mottola
Assistant Examiner—James Dudek

[57] ABSTRACT

"Voltage-distance convergence method" is utilized in an automated apparatus and method for the reproduction of same color temperature luminous intensity standard light source thereby the adjustment of the color temperature of an reproduced illuminant and the measurement of its luminous intensity may be completed in a one step preparation process.

5 Claims, 4 Drawing Sheets

AUTOMATED APPARATUS AND METHOD FOR THE REPRODUCTION OF SAME COLOR TEMPERATURE LUMINOUS INTENSITY STANDARD LIGHT SOURCE

FIELD OF THE INVENTION

The present invention relates to an automated apparatus and method for the reproduction of same color temperature luminous intensity standard light source, and in particular to an apparatus and method for automated adjustment of color temperature and for automated measurement of luminous intensity of a reproduced light source in a single process. This invention is suited for the reproduction of various same color temperature luminous intensity standard illuminants.

BACKGROUND OF THE INVENTION

A standard light source is one of the most important standards for the measurement of light. Prior to delivery from the factory or before being put to actual use, the readings for precision optical instruments (such as illuminance meters, color analyzers, etc.) must be calibrated using the standard light sources. Illuminance meters, for example, must in accordance with national standards undergo calibration with CIE standard light source A.

Many nations have their National Measurement Laboratories (NML) capable of providing standard light sources. Examples given are: the National Institute of Standards and Technology (NIST) in the USA and National Physical Laboratory (NPL) in Britain. But due to the limited useful life of these standard illuminants produced, they are not practical for use as calibration instruments. In typical application, the standard illuminant used in industry is reproduced from these laboratories' standard light source.

In other words, the standard light source (standard lamp) which users purchase from the above-mentioned laboratories emits a certain color temperature and luminous intensity when supplied with a certain level of electric voltage (or current). The color temperature and luminous for these standard illuminants have been precisely measured and have the value noted by the laboratories that produce them. By referring to the values for color temperature and luminous intensity at certain voltages (or currents) of the original standard light source, users can use a reproduction apparatus to run an electrical current through a tungsten lamp (reproduced lamp) and, by adjusting voltage (or current), cause the reproduced lamp to emit light with a color temperature identical with that of the original standard light source.

Next, by using the principle of "the inverse-square law of illumination" it is possible to calculate the luminous intensity of the tungsten lamp (reproduced lamp) based on the luminous intensity of the original standard light source (known values) and the distances between the detector and both light sources, respectively. The color temperature and luminous intensity of the tungsten lamp at a certain voltage can thus be determined, and, thus, the tungsten lamp can then be used as a standard light source. This process for reproducing a standard light source is wildly used by many standard lamp calibration laboratories.

As mentioned previously, the color temperature and the luminous intensity are the two key parameters for standard light sources. The color temperature is defined as follows: "The temperature of the a full radiator which emits radiation of the same chromaticity as the radiation considered." Luminous intensity is defined as: "The luminous flux per unit solid angle in the direction in question."

To illustrate relations between current, color temperature, and luminous intensity, three 500 W standard lamps (with C-13B tungsten filaments) are given in Table 1 as examples:

TABLE 1

| Lamp number | Current (A) | Corresponding voltage(V) | Luminous intensity(cd) | Color temperature(K.) |
|---|---|---|---|---|
| NBS9721 | 4.021 | 112.7 | 746 | 2856 |
| NBS9720 | 4.000 | 112.3 | 753 | 2856 |
| NBS9890 | 4.046 | 113.4 | 756 | 2856 |

Table 1 shows that at a designated current (for instance, 4.021 amperes for the NBS9721) these standard lamps emit light of a designated color temperature (2856K) and a designated luminous intensity (746 candle) in a designated direction.

Because color temperature and luminous intensity are the two key parameters for standard light sources, the conventional reproduction of same color temperature luminous intensity standard light source requires the use of two apparatuses (two steps): one for adjusting color temperature, and another for measuring luminous intensity.

Figure 1:
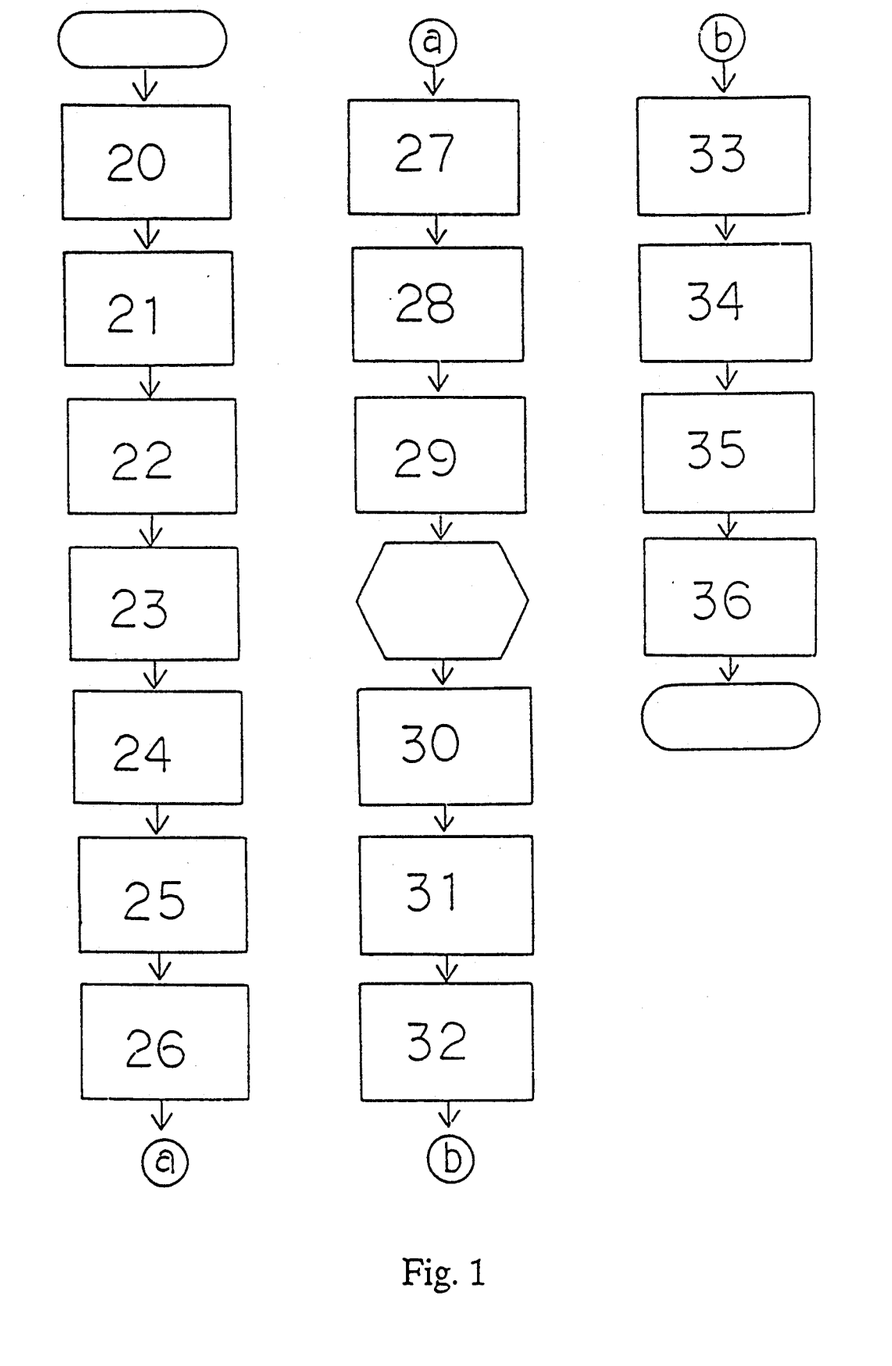
FIG. 1 is a flow chart illustrating the conventional approach for the reproduction of a same color temperature luminous intensity standard light source.

FIG. 1 is a flow chart for the traditional reproduction procedures for a same color temperature luminous intensity standard lamp. Prior to the reproduction process, a lamp which will be reproduced to be a standard light source is prepared and the color temperature and luminous intensity of a standard lamp are obtained. The first step in the reproduction process is to use a color temperature adjusting apparatus to adjust the color temperature of the reproduced lamp to that of the standard lamp.

At (20) the standard lamp is installed in the color temperature adjustment apparatus; at (21) the standard lamp is supplied with a designated current so that it emits light with characters identical to the values as given in the table 1; at (22) the red-filtered (approximately 650 nm) and blue-filtered (approximately 450 nm) detectors of the color temperature adjustment apparatus are installed at a set distance and aimed at the standard light source and the output signal intensities of the red-filtered and blue-filtered detectors are measured; at (23) the measured value of the red-filtered detector is divided by that of the blue-filtered detector to obtain the red/blue signal ratio R1. Next at (24) the standard lamp is replaced with the reproduced lamp; at (25) the input voltage to the reproduced lamp is adjusted to a work voltage; at (26) the signals at the red- and blue-filtered detectors are measured, and; at (27) the measured values are calculated to obtain red/blue signal ratio R2. At (28) the input voltage to the reproduced lamp (or current) is adjusted to where the red/blue signal ratios R2 is equivalent to R1, and at (29) the input current I and voltage V of the reproduced lamp is recorded. This completes the first stage, the color temperature adjustment procedure for the reproduced lamp.

The reproduced lamp completed through the above procedure will in theory have the same color temperature as the standard light source if there is no non-linear problem in the red-and blue-filtered detectors of the color temperature adjustment apparatus.

The next step is the measurement of the luminous intensity of the reproduced lamp. At (30) the standard lamp is installed with the luminous intensity measurement apparatus; at (31) the input current to the standard lamp is adjusted to a designated value so that it emits light with a designated luminous intensity $I_s$; at (32) the detector of the intensity measurement apparatus is installed at the distance $r_s$ from the standard lamp and the output signal value $S_1$ of the detector is measured; at (33) the standard lamp is replaced with the reproduced lamp; at (34) the input current to the reproduced lamp is adjusted to the current I obtained at (29); at (35) the distance between the detector and the reproduced lamp is adjusted to where the output signal value $S_3$ of the detector is equal to the value $S_1$ arrived at (32). At (36) the distance from the reproduced lamp to the detector $r_t$ is recorded. From the known luminous intensity $I_s$ of the standard lamp, the luminous intensity $I_t$ of the reproduced lamp can be calculated by using the "inverse square law of illumination"; thus:

$$I_t = I_s * ((r_t)^2/(r_s)^2)$$

Where $r_s$ and $r_t$ are distances arrived at (32) and (36) respectively. When the above procedures are completed it may be found that the luminous intensity of the reproduced lamp is $I_t$ when it is supplied with current I arrived at (29), and color temperature of the reproduced lamp is identical with that of the standard lamp. Users can use the above results to employ the reproduced lamp as a standard lamp.

From the above description several shortcomings can be seen in the conventional method for reproducing a standard lamp:

First, the conventional approach requires that the color temperature adjustment apparatus and the luminous intensity measurement apparatus be employed separately in two steps, i.e., to adjust color temperature and to measure luminous intensity, respectively, in order to reproduce a standard lamp. The procedures involved are extremely troublesome and time-consuming.

Also, the accuracy of the color temperature of the reproduced light source relies upon the accuracy of the red- and blue-filtered detectors. In other words, accurate adjustment of the color temperature of the reproduced lamp can only be obtained with apparatus in which the intensity of the output signals of the detectors are in linear relation with the illuminance they receive.

Below are described a series of situations in which color temperature adjustment error occurs due to failure to achieve linear relation between the intensity of the output signals of the detector and the illuminance they receive. With a tungsten filament lamp the spectral power distribution property is similar to that of a blackbody, which means that the color temperature of a tungsten filament lamp can be expressed using the ratio of spectral radiances at any two wavelengths (it is typically expressed as the ratio of spectral radiances at approximately 650 nm (blue) wavelength and at approximately 450 nm (red) wavelength). As for the detectors, the parameter of light it detects is the irradiance (or illuminance). The irradiance at wavelength $E\lambda = I\lambda/r^2$ (or $E = I/r^2$), wherein I is the radiant intensity at wavelength $\lambda$ of the light source, and r is the distance from the light source to the detector. Thus the color temperature $T_c$ of the light source can be expressed as the ratio of spectral irradiance of the light source at distance r:

$$T_c = (I_{650}/I_{450}) = (E_{650}/R^2)/(E_{450}/R^2) = (E_{650}/E_{450})$$

where $I_{650}$ and $I_{450}$ are the spectral radiant intensities at wavelengths 650 nm and 450 nm, and $E_{650}$ $E_{450}$ are the spectral irradiances at the wavelengths 650 nm and 450 nm. Assuming the standard light source of color temperature $T_c$ is located at distance r, its spectral irradiance at wavelengths 650 nm and 450 nm are $E_{650}$ and $E_{450}$, and the output signal intensities of the red- and blue-filtered detectors are $S_{650}$ and $S_{450}$, the standard light source's color temperature as measured by this instrumentation can be expressed as $R = S_{650}/S_{450}$. To adjust the color temperature of the reproduced lamp to be equivalent with that of the standard lamp, the voltage supplied to the reproduced lamp in the color temperature adjustment apparatus is adjusted to where the ratio of the output signal intensities of the red-and blue-filtered detectors equals R as measured to the standard light source. Now assuming that this adjustment has been completed, and that the signals detected by the red-and blue-filtered detectors are $aS_{650}$ and $aS_{450}$ respectively, the spectral irradiance of the reproduced illuminant at 650 nm and 450 nm should be $aE_{650}$ and $aE_{450}$, if the output signal intensities of the detectors are linear with the spectral irradiances they receive. The ratio between the red-and blue-filtered spectral irradiance of the reproduced illuminant is therefore equal to that of the standard illuminant, and accurate color temperature adjustment is obtained. If, however, the output signal intensities of the detectors are not linear with the spectral irradiances (or illuminance) they receive, then even if the same signal output ratio R is obtained and the signal output is also $aS_{650}$ and $aS_{450}$, the relative spectral irradiances could be $bE_{650}$ and $cE_{450}$, and c may not equal b. Thus the adjusted color temperature may not be equal to the color temperature $T_c$ of the standard lamp, and error will occur. This type of error is especially apparent when there is a relatively larger difference in luminous intensity between the reproduced lamp and the standard lamp.

Furthermore, the traditional method for preparing a standard lamp requires a large amount of manpower and time. Both the voltage adjustment control to the lamp as well as adjustment of the distance between the lamp and the light detectors both must be performed manually. Also, due to the high precision required, operators must spend long hours to complete the reproduction procedure.

There is thus a need to have an automated apparatus and method for the reproduction of same color temperature luminous intensity standard lamps. Said apparatus and method could simplify procedures in the reproduction of standard lamps, thereby reducing man hours and improving reproduction precision.

An object of this invention is to lower costs of manual operation and to reduce human-induced error by providing an automated apparatus and method for the reproduction of same color temperature luminous intensity standard light source.

Another object of the invention is to reduce the number of steps in the reproduction of a standard lamp by providing a method for reproducing a same color temperature luminous intensity standard light source.

Another object of the invention is to provide an apparatus and method which can eliminate the effects of non-linearity in the filtered detectors and achieve precise color temperature adjustment during the reproduction of a same color temperature luminous intensity standard light source.

Another object of the invention is to provide a one-set apparatus and a one-step procedure for the reproduction of standard light source.

SUMMARY OF THE INVENTION

It has been found that accurate adjustment/measurement can be obtained using the "voltage-distance convergence method" to fabricate an apparatus capable of simultaneously adjusting the color temperature and measuring the luminous intensity of the reproduced lamp. Use of this method and apparatus can overcome the inconvenience of separately adjusting color temperature and measuring luminous intensity. Also, where this invention is employed, computerized control can not only reduce required manpower, but also increase the efficiency and accuracy of the reproduction of standard lamps.

DETAILED DESCRIPTION OF THE INVENTION

Figure 2:
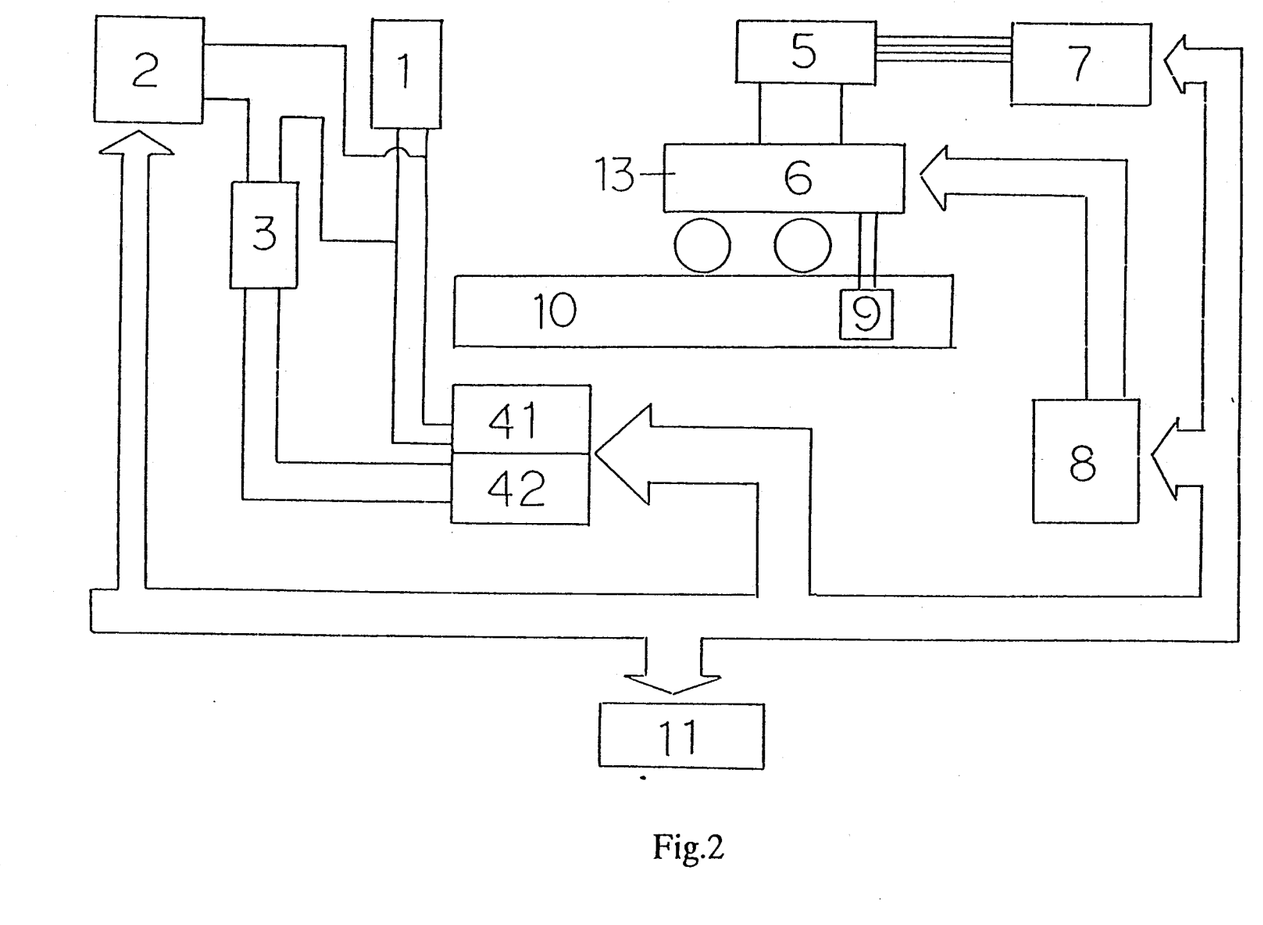
FIG. 2 is a systems layout diagram for an embodiment of the apparatus for the reproduction of same color temperature luminous intensity standard light source of this invention.
Figure 3:
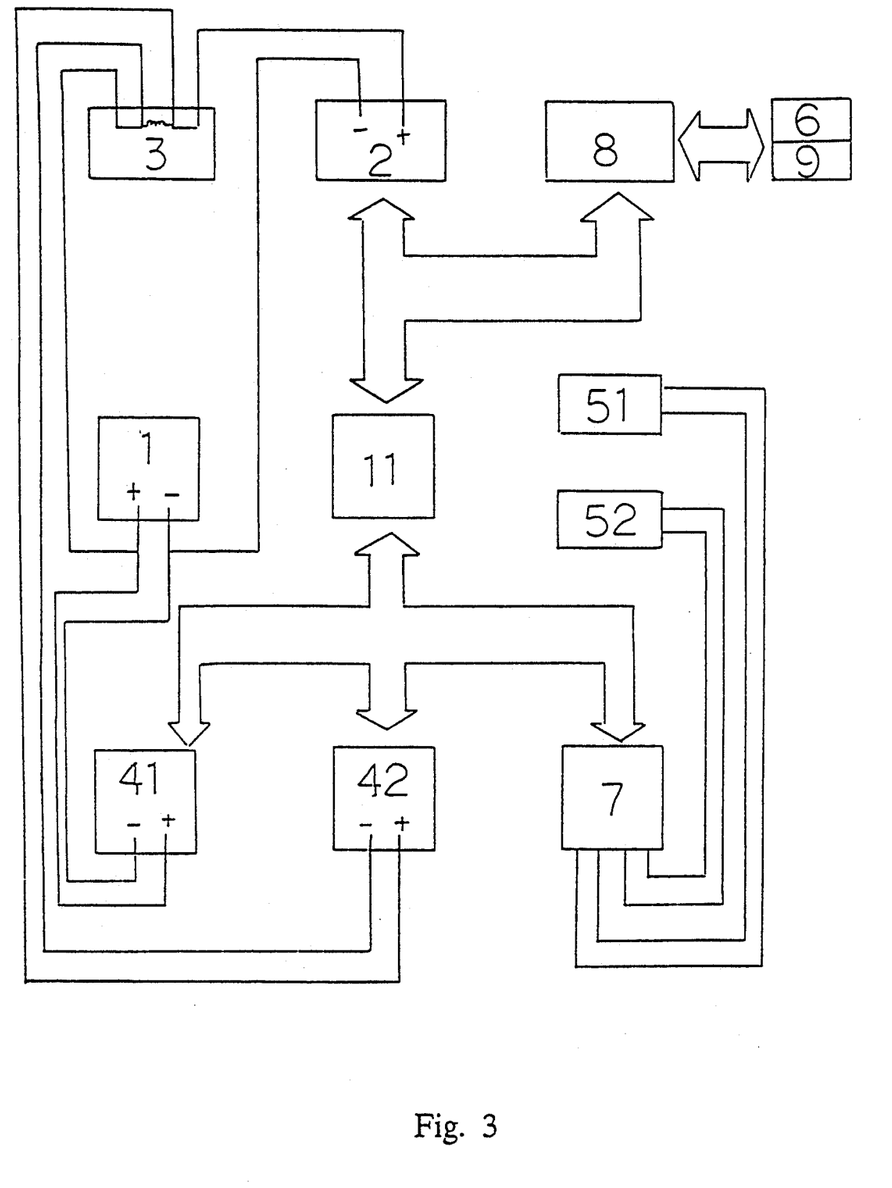
FIG. 3 is a systems wiring diagram for an embodiment of the apparatus for the reproduction of same color temperature luminous intensity standard light source of this invention.

FIG. 2 is a systems layout diagram illustrating an embodiment of the apparatus for the reproduction of same color temperature luminous intensity standard light source of this invention; FIG. 3 is its wiring diagram. The same numbers are given to those members that appear in both charts.

As shown in FIG. 2 and FIG. 3, the apparatus of this embodiment comprises a lamp base (1) connected to a DC power supply (2) and linked in series to a standard resistor (3); two multimeters (4), one of which (42) measures the potential difference at the two ends of the standard resistor in order to calculate the current supplied to the lamp, and another (41) which measures input voltage to the lamp through direct connection to the two terminals of the lamp base (1). A computer and an interface card (11) controls the output voltage of the power supply by providing feedback based on the voltage values and current values measured by the multimeters (4); at the light sensing and there is an integrating sphere( 5) on which are a small fixed-size apertures facing the light source; one side of the integrating sphere is installed with a red-filtered detector (51), and the other side with a blue-filtered detector (52); the computer (11), with the aid of an A/D converter and an amplifier (7), can acquire signal intensities from the red-filtered detector (51) and the blue-filtered detector (52); the computer (11) also controls the power supply's voltage level and the distance between the detector to the light-source distance based on the signal acquired from the detectors; the integrating sphere (5) is secured to a moveable trolley (13); the computer (11), with the aid of a controller and distance indicator (8), controls a stepping motor (6) which moves the trolley (13) in order to adjust the distance from the light source (1) to the integrating sphere's (5) red- and blue-filtered detectors (51) (52). The distance indicator (8) detects the distance through a magnetic head (9) that moves along a magnetic tape (10).

Figure 4:
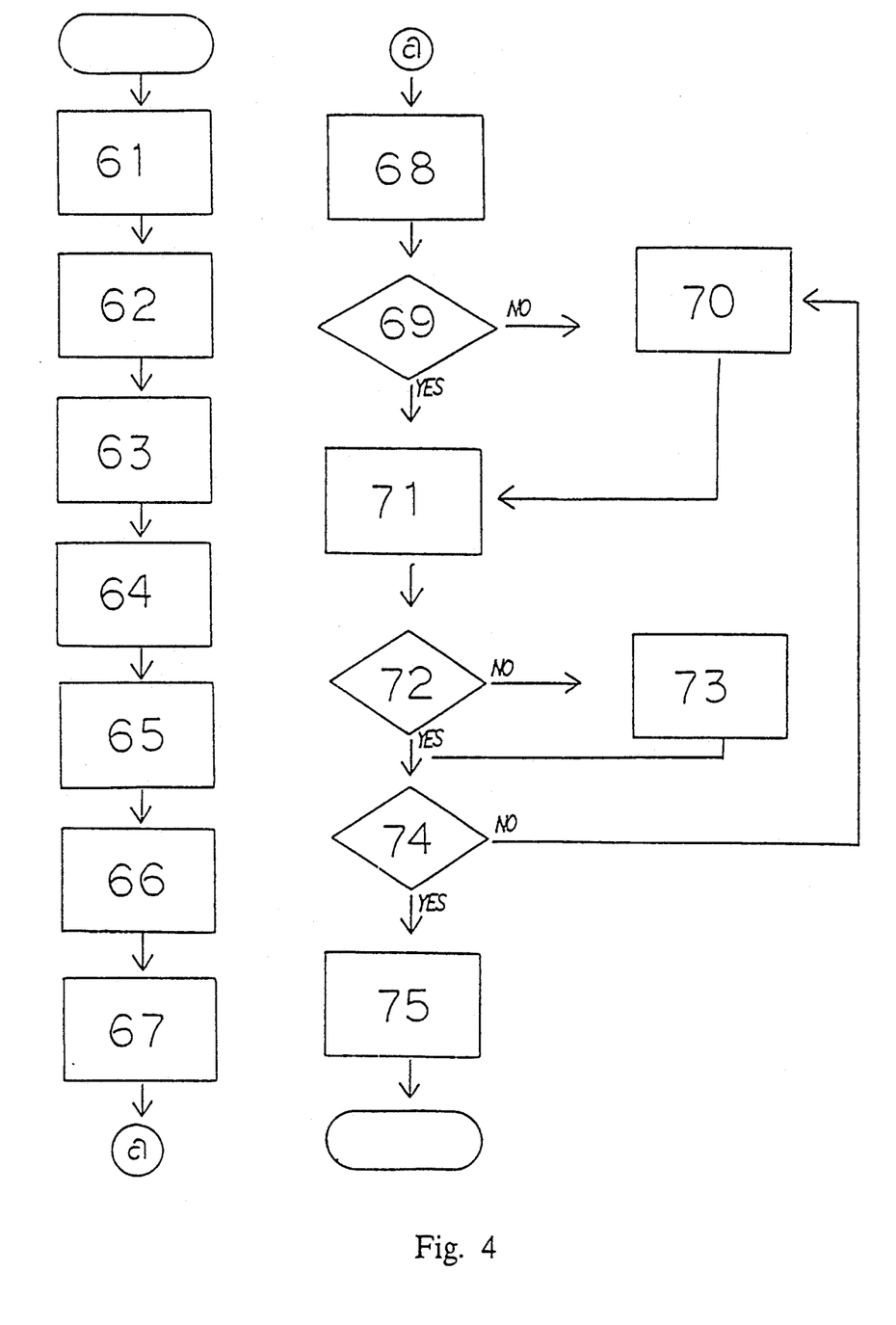
FIG. 4 is a flow chart of the process of an embodiment of the method for the reproduction of same color temperature luminous intensity standard light source of this invention.

Referring now to FIG. 4, which shows the procedure for reproducing a standard light source using the above systems.

At (61) a standard lamp is secured to the lamp base (1) as shown in FIG. 2. At (62) the computer, based on the potential difference measured by the multimeter (42) at the two ends of the standard resistor (3), provides feedback control to the power supply (2) in order to set the current to the standard lamp at a designated value. The light emitted by the standard lamp at this time is the standard light source, and has a set color temperature $T_c$ and a set luminous intensity $I_s$.

Next, at (63) the computer drives the stepping motor (6) to adjust the distance from the integrating sphere (5) to the light source (1) so that the signal intensity of the red-filtered detector becomes the set value S1=60.000. At (64) the computer acquires the signal values S1 and S3 from the red-and blue-filtered detectors (51) (52); at (65) the computer divides the two signals to obtain the ratio R1 (=S1/S3), and records the ratio R1 and the signal S1.

At (66) the standard lamp is replaced with the reproduced lamp, and the computer (11) controls the output voltage of the power supply (2) to the lamp's specification voltage. At (67) the computer (11) acquires the signal values S2 and S4 from the red-and blue-filtered detectors; at (68) these two signals values are divided with each other to obtain the ratio R2 (=S2/S4), and; at (69) the computer (11) compares R2 and R1 obtained at step (65). If R2>R1, then the input voltage to the reproduced lamp is increased; otherwise, the voltage is decreased until R2=R1.

At (71) the computer (11) once again acquires the signal value S2 from the red-filtered detector, and at (72) compares S2 with S1 of step (65). If S2≠S1, then at (73), if S2>S1, the controller (11) drives the stepping motor (6) to increase the distance between the detectors assembly (5) and the light source; otherwise the distance is decreased until S2=S1.

At (74), if the value for R2 changes due to a new value for S2 and S4 and R2=R1, then step (70) is repeated until the ratio R2 equals R1.

Repeating steps (70) to (74) can produce a convergence current I and distance $r_t$ so that R2=R1 and S2=S1, wherein the signal value picked up from the standard lamp by the red-filtered detector is S4, and since R1=R2, and S1=S2, then from the definition of R1 and R2: R1=(S1/S3) and R2=(S2/S4), we know S3=S4. In other words, because S1 and S2 are now equal (meaning that the red-filtered detector is receiving the same illuminance from the standard lamp as from the reproduced lamp), and S3=S4 (meaning that the blue-filtered detector is receiving the a illuminance from the standard lamp as from the reproduced lamp), the color temperature adjustment will be unaffected whether or not there is a nonlinear relation between the detector's output and their received illuminance.

Then, at (75), employing the principle of "the inverse-square law of illumination", the luminous intensity $I_t$ of the light source can be calculated by referring to the luminous intensity and measured distance of the standard lamp.

At the moment, we know that the reproduced lamp will emit light of luminous intensity $I_t$ and color temperature $T_c$ when we apply current I to it.

The above-mentioned processes may be called: "Voltage-distance convergence method".

The following embodiment is provided to prove the effects resulted at by this invention.

EMBODIMENT

A standard lamp is derived form the NPL with the following standard values:

TABLE 2

| Lamp number | Current (A) | Luminous intensity(cd) | Color temperature(K.) |
|---|---|---|---|
| P67 | 8.5820 | 1620 | 2856 |

First the standard lamp is placed on the lamp base and supplied with DC current 8.582 Ampere. Then the detectors are moved to where the output signal intensity of the red-filtered detector reaches the set value (in this embodiment, 60.000), and the lamp-to-detector distance and the other data are obtained, as shown in Table 3.

TABLE 3

| | |
|---|---|
| Lamp.number: | p67 |
| Voltage (V): | p81.90 |
| Current (A): | 81.582 |
| Red-filtered detector signal value (S1): | 60.000 |
| Blue-filtered detector signal value (S3): | 52.961 |
| Red/blue ratio R1 = S1/S3: | 1.1329 |
| Light source-detector distance (mm): | 3816.3 |

Next, the standard lamp is replaced with the reproduced lamp having a 500 W 120 V tungsten filament bulb of C-13B filament specification and a model T-20 bulb. First the input Voltage to the reproduced lamp is set to 120 V, and then adjust again the input voltage of reproduced lamp to where the red-blue ratio (R2=S2/S4) is equal to R1 (R2=R1=1.1329) as shown in Table 3 so to obtain data No. 1 as shown in Table 4. Next, the voltage is fixed and the distance from the light source to the detectors is adjusted until the output signal intensity S2 of the red-filtered detector is the same as the measured value S1 of the red-filtered of the standard lamp (S2=S1=60.000), as shown in Table 3, and obtain data No. 2 as shown in Table 4. The distance from the light detectors to the reproduced lamp is reduced from 3753.4 mm to 2549.7 mm, and the red/blue ratio R2 from 1.1329 to 1.1321. Next the distance is fixed, and the input voltage to the reproduced lamp is adjusted again so that the red/blue ratio returns to 1.1329 to give the data no. 3 status, at which point the voltage is once again fixed, and the distance from the light source to the light detectors adjusted to where the signal value of the red-filtered detector returns to 60.000 to give the data no. 4 state. Distance is then fixed once again, and the voltage adjusted to where the red/blue ratio reaches 1.1329 to give the data no. 5 state. The distance from the light source to the detectors is then readjusted to where S2 returns to 60.000 to give the data no. 6 state. At the moment R2=R1 and S2=S1, the convergence procedure is complete.

TABLE 4

| DATA NO. | 1 | 2 | 3 | 4 | 5 | 6 |
|---|---|---|---|---|---|---|
| Change in voltage: | 112.20 | 112.20 | 112.03 | 112.03 | 112.04 | 112.04 |
| Change in current: | 4.015 | 4.015 | 4.007 | 4.007 | 4.010 | 4.010 |
| Red-filtered detector signal intensity (S2): | 27.811 | 60.000 | 59.709 | 60.000 | 60.150 | 60.000 |
| Blue-filtered detector signal intensity (S4): | 24.548 | 52.998 | 52.705 | 52.919 | 53.294 | 52.966 |
| Red/blue ratio (R2): | 1.1329 | 1.1321 | 1.1329 | 1.1338 | 1.1329 | 1.1327 |
| Change in distance (mm): | 3753.4 | 2549.7 | 2549.7 | 2543.7 | 2543.7 | 2544.2 |

When the convergence procedure is complete, S2=S1, S4=S3, and thus even if the red-and blue-filtered detectors' output signal are non-linear relative to the illuminance they received, it does not affect the accurate adjustment of the color temperature. Also, because the red/blue spectral radiant intensity ratio R2 of the reproduced lamp is the same as R1 of the standard lamp, the color temperature of the two lamps is the same as well. Furthermore, at this convergence distance, the illuminance received by the detectors is the same as that measured from the standard lamp, therefore the principle of "the inverse-square law of illumination can be used to calculate the luminous intensity $I_t$ of the reproduced lamp:

$$I_t = I_s * ((r_t)^2/(r_s)^2)$$
$$= 1620 * ((2544.2)^2/(3816.3)^2)$$
$$= 720 \ (cd)$$

Every step in the above processes, except the installation of the lamps, is computer-automated.

Tests of the reproduced lamp prepared by means of the above apparatus and method show that the random uncertainty is 0.14% in the reproduction of the 500 W 120 V standard illuminant, which proves that the present invention is capable of accurate reproduction of a standard illuminant.

From the above descriptions it can be seen that when the above-mentioned "voltage-distance convergence" method is used, this invention can, under the control of a computer system, perform in one step the dual task of color temperature adjustment and luminous intensity measurement, thereby saving time and effort in the reproduction of a standard illuminant. Also, the non-linearity factor of the red-and blue-filtered detectors will not affect the accuracy of the reproduction of the standard light source when this invention is employed. The invention thus provides superior performance.

Furthermore, although the standard lamp reproduction process used in this embodiment employs a red-filtered detector and a blue-filtered detector, any combination of two detectors that detect spectral irradiance of wavelengths differing by more than 100 nm in the visible range may be used in the invention.

The embodiments described above serve only as examples of the features and results of the present invention; the scope of the present invention is not confined to the details set forth therein. Those skilled in the art will be able to make various modifications and improvements within the scope of the above descriptions, but all such modifications and improvements shall come under the scope of the present invention.

What is claimed is:

1. Apparatus for the reproduction of a standard light source having same color temperature luminous intensity from a standard illuminant at a designated color temperature, comprising:

a power supply for supplying electric power;

a light source coupler used to make an electrical connection between said power supply and said standard illuminant or said standard light source to be reproduced;

a light detector assembly, comprising at least a first wavelength spectral irradiance detector and a second wavelength spectral irradiance detector for detecting intensities of a spectral irradiance component at a first wavelength and a spectral irradiance component at a second wavelength component, respectively, of light emitted by said standard illuminant or said standard light source to be reproduced when coupled with said coupler;

a displacement apparatus for mounting and driving said light detector assembly so that it adjusts a test distance relative to said light source coupler;

a system controller, comprising:

memory means, for recording detected values of said intensities of said second wavelength spectral irradiance component, designated as S1, and of said first wavelength spectral irradiance component, designated as S3, the ratio between S1 and S3, designated as R1 (i.e., R1=S1/S3), the luminous intensity, designated as $I_S$, of the standard illuminant, and the test distance, designated as $r_s$, under a predetermined voltage or current;

first controlling and recording means, for controlling an input voltage or current to said standard light source to be reproduced, for setting predetermined values, and for recording values of said input voltage or current;

second controlling and recording means, for controlling the distance between said light detector assembly and said standard light source to be reproduced, and recording said distance as $r_t$;

recording and calculating means for recording, based on output signals of said light detector assembly, detected values of intensities of said second wavelength spectral irradiance component, designated as S2, and of said first wavelength spectral irradiance component, designated as S4, and the ratio between S2 and S4, designated as R2 (i.e., R2=S2/S4);

first control means, which compares the values of R2 and R1, and when R2>R1, issues a command to said first controlling and recording means to raise input voltage to said standard light source to be reproduced; otherwise, to lower input voltage until R2=R1;

second control means, which compares the values of S2 and S1, and when S2>S1, issues a command to said second controlling and recording means to increase the distance from said light detector assembly to said standard light source to be reproduced; otherwise, to reduce said distance until S2=S1, and record said distance as $r_t$, and;

calculation means, which uses the following formula to calculate a luminous intensity $I_t$ of said standard light source to be reproduced when R2=R1 and S2=S1;

$$I_t = I_s * ((r_t)^2/(r^s)^2), \text{ and;}$$

recording means for recording said luminous intensity $I_t$ of and input current to said standard light source to be reproduced when R2=R1 and S2=S1.

2. The apparatus according to claim 1, wherein the wavelength detected by said first wavelength detector and the wavelength detected by said second wavelength detector are in the visible range and differ by more than 100 nm.

3. The apparatus according to claim 1, wherein said first control means and said second control means function in alternation until R2=R1 and S2=S1.

4. A method for reproduction of a same color temperature luminous intensity standard light source from a standard light source employing a system comprising: a light source coupler, a power supply, a detector assembly including at least a first wavelength detector and a second wavelength detector, a displacement means able to control the relative distance between said detector assembly and said light source coupler, and memory means for recording at least the following values: luminous intensity ($I_s$) of at least one standard illuminant a a predetermined voltage or current at a tested distance $r_s$, a detected value (S1) for light component at said first wavelength, a detected value (S3) for light component at said second wavelength, respectively, emitted by said standard illuminant, and the ratio R1 of S1 and S3 (i.e., R1=S1/S3), comprising the steps of:

(A) installing a standard light source to be reproduced to said light source coupler and placing said detector assembly at a predetermined distance from said light source coupler;

(B) supplying a predetermined input voltage or current to said standard light source to be reproduced while measuring, using said light detector assembly, value (S2) for light component at said second wavelength and value (S4) for light component at said first wavelength, respectively, emitted by said standard light source to be reproduced;

(C) calculating the ratio of S2/S4 and recording said ratio as R2;

(D) comparing R2 to R1, and if R2>R1, raising the input voltage to said standard light source to be reproduced, otherwise lowering said input voltage until R2=R1, and recording final voltage value;

(E) fixing said input voltage at the v final voltage value obtained from step (D), and comparing the values of S2 and S1; if S2>S1, increasing the distance from said light detector assembly to said standard light source to be reproduced; otherwise decreasing said distance until S2=S1; recording final distance value;

(F) repeating steps D and E until R2=R1 and S2=S1, and recording the final input voltage value, or final input current value, and the final distance value from said detectors assembly to said reproduced light source; and (G) evaluating luminous intensity $I_r$ of said light source to be reproduced according to the following formula:

$$I_r = I_s ((r_r)^2/(r_s)^2)$$

5. The method according to claim 4, wherein the wavelength at which said first wavelength detector detects and the wavelength at which said second wavelength detector detects are in the visible wavelength range and differ by more than 100 nm.

* * * * *